(12) United States Patent
Jang (10) Patent No.: US 8,651,388 B2
(45) Date of Patent: Feb. 18, 2014

(54) METHOD FOR READING CODE DISPLAYED ON PRINTED MATTER

(75) Inventor: Hyo Sun Jang, Masan-si (KR)

(73) Assignee: Intellectual Discovery Co., Ltd. (KR)

( * ) Notice: Subject to any disclaimer, the term of this patent is extended or adjusted under 35 U.S.C. 154(b) by 69 days.

(21) Appl. No.: 13/055,450

(22) PCT Filed: Oct. 22, 2010

(86) PCT No.: PCT/KR2010/007290
§ 371 (c)(1),
(2), (4) Date: Oct. 26, 2011

(87) PCT Pub. No.: WO2011/049408
PCT Pub. Date: Apr. 28, 2011

(65) Prior Publication Data
US 2012/0048936 A1    Mar. 1, 2012

(30) Foreign Application Priority Data

Oct. 22, 2009  (KR) .......... 10-2009-0100642

(51) Int. Cl.
*G06K 19/06*    (2006.01)
(52) U.S. Cl.
USPC ....................................... 235/494

(58) Field of Classification Search
USPC .................................. 235/487, 494
See application file for complete search history.

(56) References Cited

U.S. PATENT DOCUMENTS

| | | | | |
|---|---|---|---|---|
| 2005/0173544 A1* | 8/2005 | Yoshida | | 235/494 |
| 2006/0154559 A1* | 7/2006 | Yoshida | | 446/297 |
| 2008/0252916 A1* | 10/2008 | Huang | | 358/1.9 |
| 2010/0133351 A1* | 6/2010 | Yoshida | | 235/494 |

FOREIGN PATENT DOCUMENTS

| | | |
|---|---|---|
| CN | 1695158 A | 11/2005 |
| CN | 101091185 A | 12/2007 |
| JP | 07-098751 | 4/1995 |
| JP | 2008-210402 | 9/2008 |
| JP | 2008-210402 A | 9/2008 |
| JP | 2008210402 A | 9/2008 |
| WO | WO2004/084125 | 9/2004 |

* cited by examiner

*Primary Examiner* — Christle Marshall (57) ABSTRACT

A method for reading a code displayed on printed matter is disclosed. The present invention is implemented by reading a segment code referring to predetermined data, which is displayed, extracting direction information of the read segment code, and interpreting the data which the read segment code refers to on the basis of the extracted direction information. According to the present invention, the code printed on the printed matter is read without using a bar code to output text, voice, image, moving picture information, and the like corresponding to the read code.

16 Claims, 9 Drawing Sheets

METHOD FOR READING CODE DISPLAYED ON PRINTED MATTER

CROSS-REFERENCE TO RELATED APPLICATION

This application is a U.S. National Phase Application of PCT International Application PCT/KR2010/007290, filed Oct. 22, 2010, which claims the benefit under 35 U.S.C. §119(a) of Korean Patent Application No. 10-2009-0100642, filed on Oct. 22, 2009, the disclosure of which is incorporated herein by reference in its entirety.

TECHNICAL FIELD

The present invention relates to a method for reading a code displayed on printed matter, and more particularly, to a method for reading a code displayed on printed matter, which can read the code printed on the printed matter without using a bar code and output text, voice, image, moving picture information, and the like corresponding to the read code.

BACKGROUND ART

In the related art, an information outputting method of outputting information such as voice, and the like has been proposed. For example, a method of outputting the information and the like by previously storing information which coincides with key information granted to a storage unit and searching the stored information from a key read from a bar code reader has been proposed. Further, a technology of outputting voice information by generating a dot pattern in which minute dots are arranged in accordance with a predetermined rule are arranged and receiving and digitalizing the dot pattern printed on the printed matter, and the like by using a camera has been proposed.

However, the known method of outputting voice and the like by the bar code has a problem in that the bar code printed on the printed matter, and the like is an eyesore. Further, since the bar code is large and occupies a part of a paper surface, it is impossible to allocate a lot of bar codes which are easily recognized for each character or target having a meaning which appears in a partial sentence or a photograph, a picture, and an image of a graphic in respect to a layout.

DISCLOSURE

Technical Problem

Accordingly, there is an object of the present invention to provide a method for reading a code displayed on a printed matter, which can read the code printed on the printed matter, and the like without using a bar code and output text, voice, image, moving picture information, and the like corresponding to the read code.

Technical Solution

A method for reading a code displayed on a printed matter according to one aspect of the present invention includes: reading a segment code which is a segment type code referring to predetermined data, which is displayed; extracting direction information of the read segment code; and interpreting the data which the read segment code refers to on the basis of the extracted direction information.

Preferably, the segment code is displayed on the printed matter for each cell and the direction information of the segment code includes positional information of the segment code in the cell where the segment code is displayed.

A method for reading a code displayed on a printed matter according to another aspect of the present invention includes: reading dot codes which are each formed by a pair of points referring to predetermined data, which is displayed on the printed matter; extracting direction information of a segment constituted by the read dot codes; and interpreting the data which the read dot codes refer to on the basis of the extracted direction information.

Preferably, the dot codes are displayed on the printed matter for each cell and the direction information of the segment includes positional information of the segment in the cell where the dot codes are displayed.

Preferably, the extracting of the direction information includes extracting center points on the segment constituted by the dot codes.

Preferably, the extracting of the direction information further comprises extracting a straight line connecting the extracted center points with each other.

Preferably, the extracting of the direction information further comprises recognizing a cell defined based on the extracted straight line as a cell on the printed matter.

Preferably, the extracting of the direction information further comprises extracting direction information of a dot code which is most distant from a dot code which is most adjacent to the center point of the cell on the printed matter where the dot code is displayed.

Preferably, the extracting of the direction information further comprises extracting a straight line connecting the center points of the cells on the printed matter and detecting a rotation degree of the extracted straight line.

Preferably, the reading of the dot codes includes recognizing a predetermined point(dot) and a point(dot) which is most adjacent to the predetermined point(dot) as the dot codes.

A method for reading a code displayed on a printed matter according to the other aspect of the present invention includes: reading a cell set constituted by a plurality of cells where dot codes are displayed, which are each formed by a pair of points referring to predetermined data, which is displayed on the printed matter; and interpreting data which the read cell set refers to on the basis of a direction information of a segment constituted by the dot codes which are formed by the pair of points, which are displayed in each of the plurality of cells constituting the cell set.

Preferably, the reading of the cell set includes: detecting a noise region where no data is read; and recognizing a plurality of cells surrounded by the detected noise region as the cell set.

Preferably, the method further comprises correcting the read cell set through rotation at an angle between the direction of the noise region which is the direction of an extended straight line extended from each of quadrangular sides of the noise region constituted by the quadrangular sides surrounding the cell set and a predetermined reference line after reading the cell set.

In accordance with the present invention, there is provided a recording medium in which a program for executing each of the steps of any one of above description is recorded.

And, in accordance with the present invention, there is provided an apparatus for reading a code displayed on a printed matter in which a program for executing each of the steps of any one of above description is installed.

Further, in accordance with the present invention, there is provided a product printed with a code read by a method for reading a code displayed on the printed matter of any one of above description.

Advantageous Effects

According to an exemplary embodiment of the present invention, it is possible to read a code printed on a printed matter, and the like without using a bar code and output text, voice, image, moving picture information, and the like corresponding to the read code.

DESCRIPTION OF DRAWINGS

The above objects, features and advantages of the present invention will become more apparent to those skilled in the related art in conjunction with the accompanying drawings. In the drawings.

BEST MODE

Hereinafter, the present invention will be described in more detail with reference to the accompanying drawings. It should be noted that in the case where it is judged that a specific description for a known function with respect to the present invention and a configuration thereof may unnecessarily obscure the gist of the present invention, it will be omitted.

Figure 1:
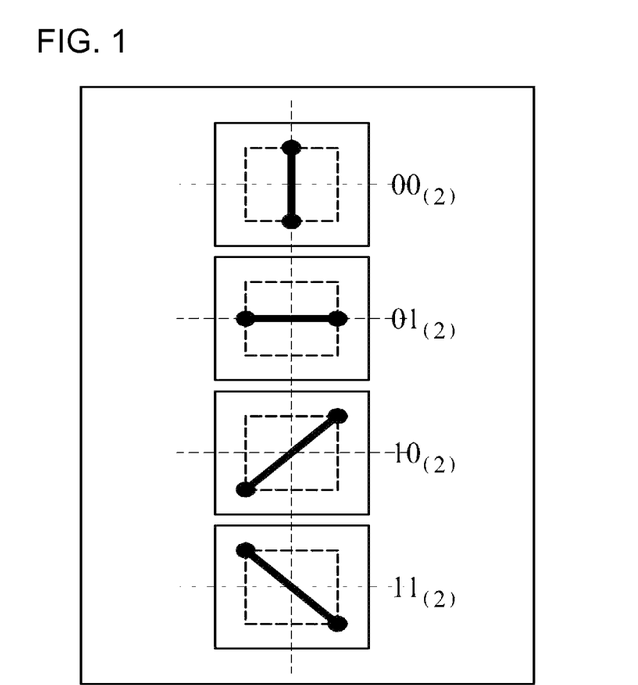
FIGS. 1 and 2 are diagrams illustrating a method for reading a code printed on a printed matter, and the like according to an exemplary embodiment of the present invention.
Figure 2:
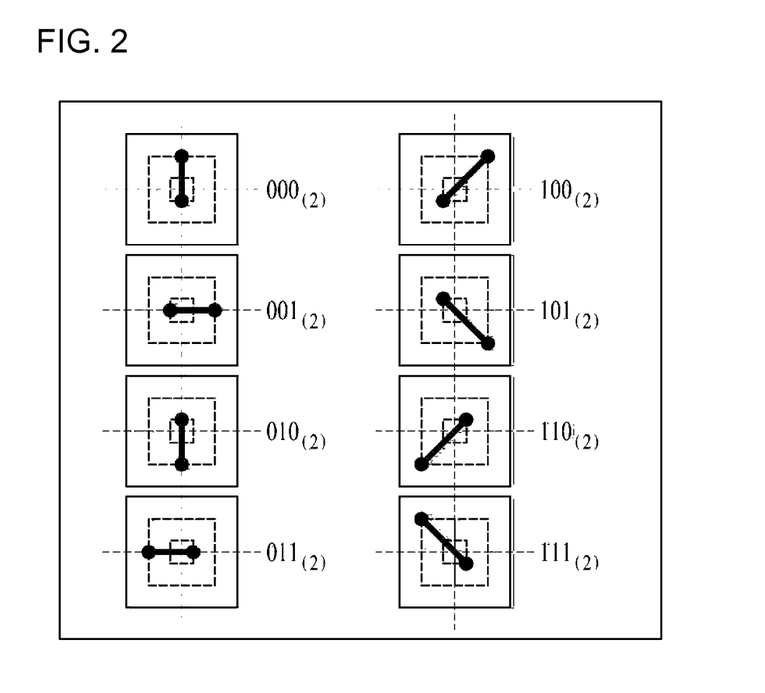

FIGS. 1 and 2 are diagrams illustrating a method for reading a code printed on a printed matter according to an exemplary embodiment of the present invention. First, a segment type code referring to predetermined data shown in FIG. 1 is displayed on the printed matter. In executing the present invention, the segment type code can be printed by overlapping with a printing surface of the printed matter.

A code reading apparatus according to the present invention reads the segment code and thereafter, extracts direction information of the read segment code.

The code reading apparatus can extract the direction information of the segment code and thereafter, output text, voice, image, moving picture information corresponding to the extracted direction information.

In FIG. 1, four types of direction information are displayed and the code reading apparatus reads data which the read segment code refers to as "00", "01", "10", and "11", respectively on the basis of the extracted direction information.

Meanwhile, in executing the present invention, eight types of direction information may be displayed as shown in FIG. 2.

In this case, the code reading apparatus reads the data which the read segment code refers to as "000", "001", "010", "011", "100", "101", "110", and "111", respectively on the basis of the extracted direction information.

Meanwhile, as shown in FIG. 2, in order to discriminate "000" and "010", "001" and "011", "100" and "110", and "101" and "111" which have the same directionality but are placed at different positions in the cell by using the code reading apparatus, the code reading apparatus needs to analyze the direction information including positional information of the corresponding segment code in each cell where each segment code is displayed.

Specifically, each cell is divided into quadrants by two axes (i.e., x and y axes) passing the center point of each cell and data which the segment code refers to may be read in accordance with the position of each segment code on the quadrants.

Figure 3:
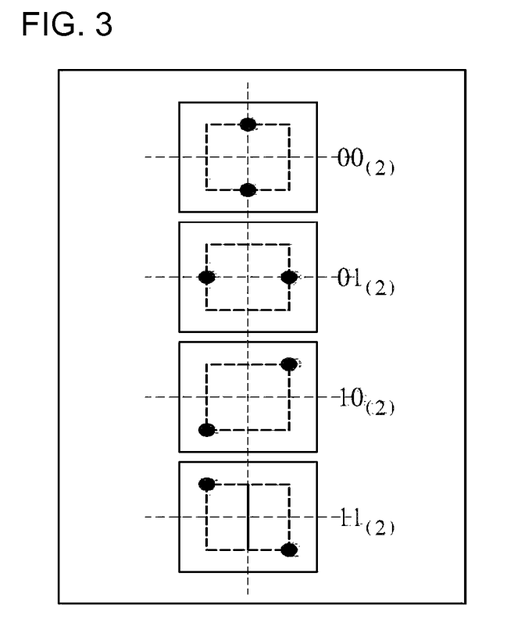
FIGS. 3 and 4 are diagrams illustrating a method for reading a code printed on a printed matter, and the like according to another exemplary embodiment of the present invention.
Figure 4:
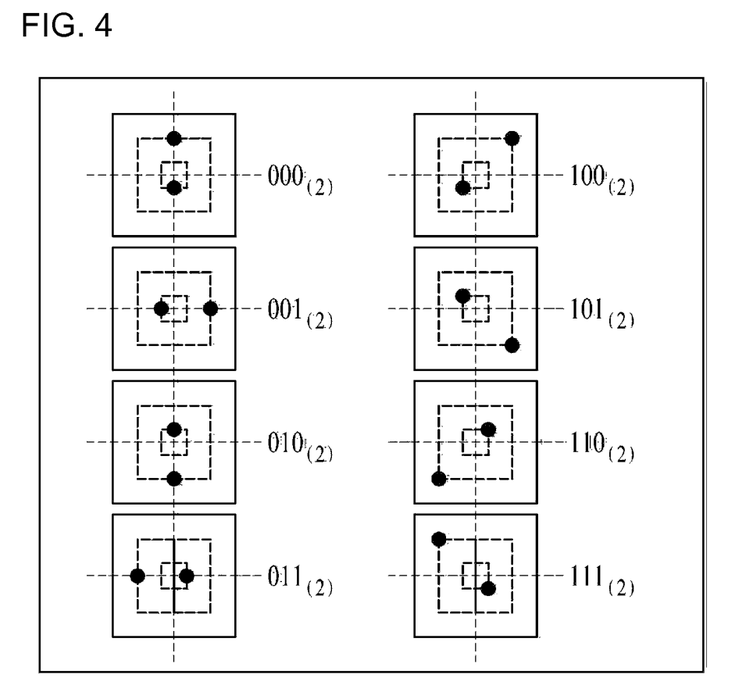

FIGS. 3 and 4 are diagrams illustrating a method for reading a code printed on a printed matter, and the like according to another exemplary embodiment of the present invention.

Referring to FIGS. 3 and 4, dot codes referring to predetermined data are displayed on a printed matter for each cell. The dot codes displayed in FIGS. 3 and 4 only indicate both endpoints of the segment codes of FIGS. 1 and 2.

In order to interpret data on the basis of the dot codes in FIGS. 3 and 4, extracting a segment constituted by dot codes read by a code reading apparatus is additionally required.

That is, the code reading apparatus needs to read the dot codes displayed for each cell and extract the segment constituted by the read dot codes and thereafter, extract direction information of the extracted segment.

Thereafter, the code reading apparatus may interpret data which the read dot codes refer to on the basis of the extracted direction information.

In executing the present invention, in order to read the dot codes, determining the dot codes is preferably preceded through recognizing a predetermined point(dot), and a point (dot) which is positioned most adjacent to the predetermined point(dot) as the dot codes.

Meanwhile, as shown in FIG. 4, in order to discriminate "000" and "010", "001" and "011", "100" and "110", and "101" and "111" which have the same directionality but are placed at different positions in a cell by using the code reading apparatus, the code reading apparatus needs to analyze the direction information including positional information of the segment constituted by the dot codes in each cell.

Specifically, each cell is divided into quadrants by two axes (i.e., x and y axes) passing the center point of each cell and the data which the segment code refers to may be read in accordance with the position of each segment constituted by the dot codes on the quadrant.

Moreover, in executing the present invention, the code reading apparatus may interpret data to determine what paired data in each cell refers to through a method of extracting the direction information of the dot code on the basis of a dot code which is positioned most adjacent to the center point in each cell among the dot codes read in each cell.

Figure 5:
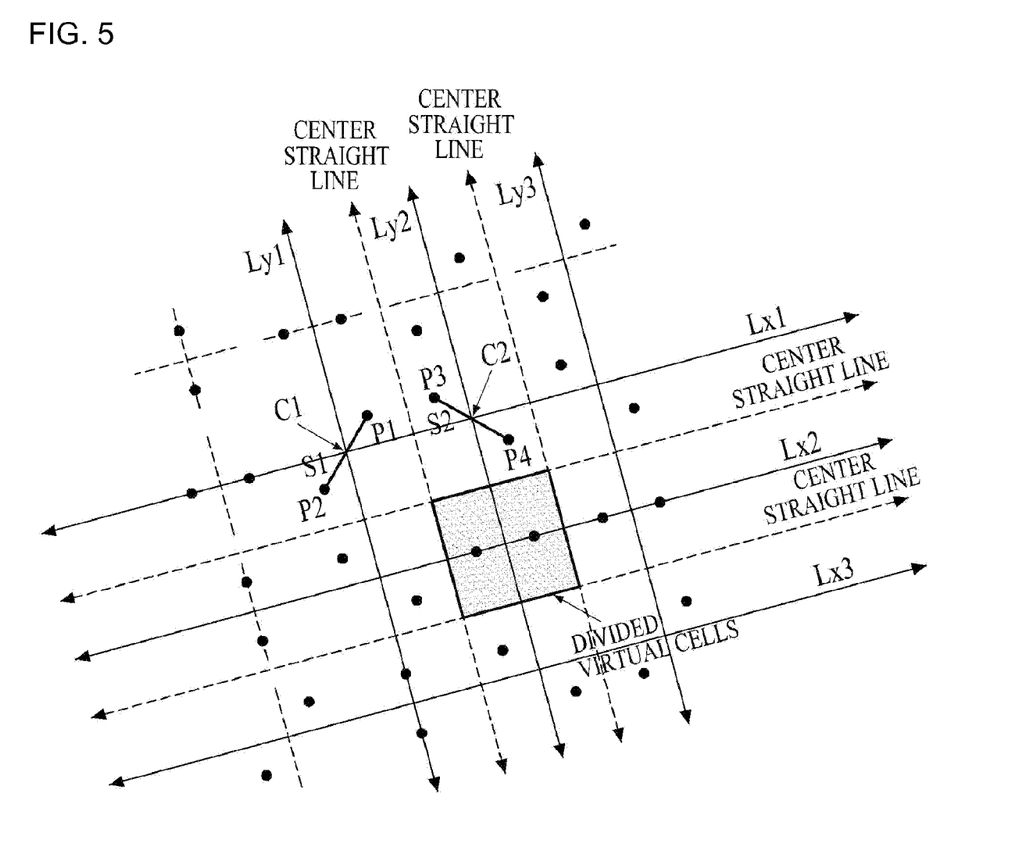
FIG. 5 is a diagram illustrating a method for reading a code in the case where a printed matter in which dot codes shown in FIG. 3 are printed is placed at a regular position.

FIG. 5 is a diagram illustrating a method for reading a code in the case where a printed matter in which dot codes shown in FIG. 3 are printed is placed at a regular position. As shown in FIG. 5, in the case where the printed matter is not placed at a regular position, rotation degree of the printed matter needs to be detected in order to accurately read the direction information of a segment constituted by two dot codes.

Therefore, in executing the present invention, the code reading apparatus extracts the center point on the segment constituted by the dot codes and extracts straight lines connecting the extracted center points.

That is, the center point C1 of the dot codes P1 and P2 is extracted, the center point C2 between other dot codes P3 and P4 is extracted, and a straight line Lx1 connecting the center points C1 and C2 to each other is extracted.

By detecting the rotation degrees of the extracted straight lines, the code reading apparatus may accurately read the direction information of the segment.

Moreover, the code reading apparatus recognizes as a cell on the printed matter in which each dot code is printed therein a cell surrounded by a center straight line among straight lines positioned between the extracted straight lines in parallel so as to extract the direction information of the segment constituted by the dot codes in each cell.

Figure 6:
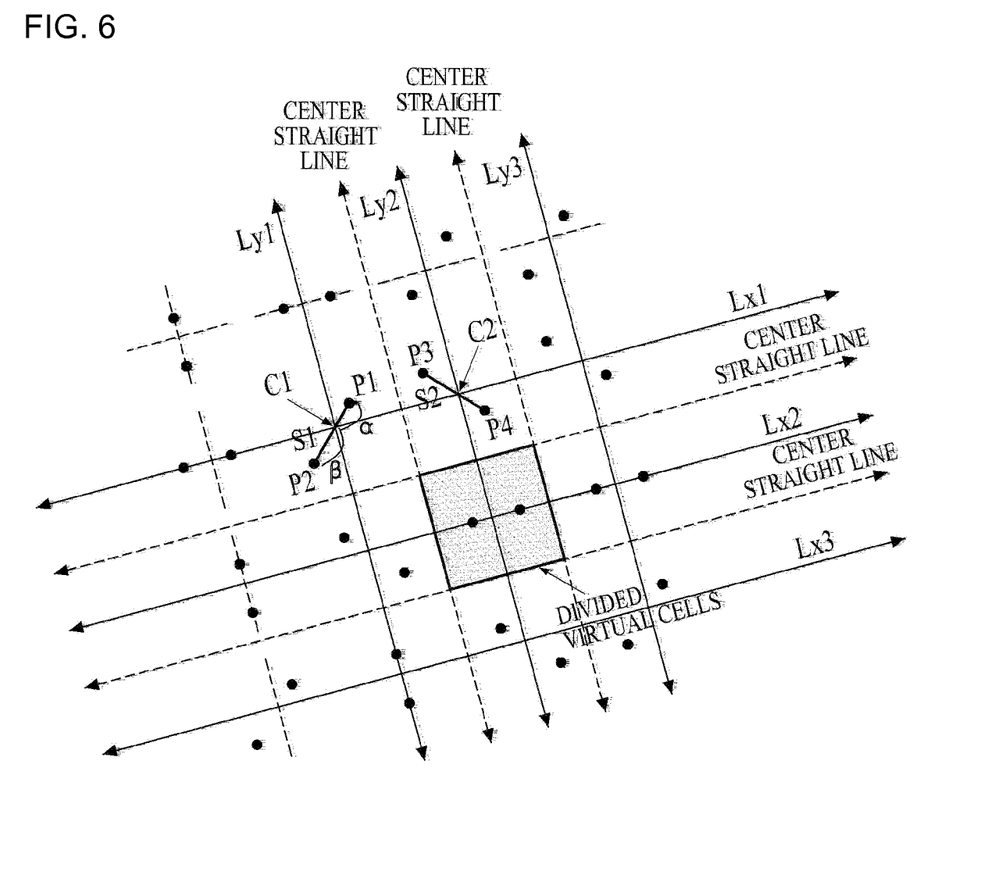
FIG. 6 is a diagram illustrating a method for reading a code in the case where a printed matter in which dot codes shown in FIG. 4 are printed is not placed at a regular position.

FIG. 6 is a diagram illustrating a method for reading a code in the case where a printed matter in which dot codes shown in FIG. 4 are printed is not placed at a regular position.

As shown in FIG. 6, in the case where the printed matter is not placed at a regular position, rotation degree of the printed matter needs to be detected in order to accurately read the direction information of a segment constituted by two dot codes.

For this, in executing the present invention, the code reading apparatus extracts the center point on the segment constituted by the dot codes and extracts straight lines connecting the extracted center points.

In order to extract the center point on the segment constituted by the dot codes, a coordinate of the center point of another point P2 which is positioned most adjacent to a predetermined point P1 may be calculated through an internally dividing point calculating equation $\alpha:\beta$ of P1 and P2 by representing the length of a segment short from the center point as $\alpha$ and representing the length of a segment which is long from the center point as $\beta$.

That is, the center point C1 of the dot codes P1 and P2 is extracted, the center point C2 between other dot codes P3 and P4 is extracted, and a straight line Lx1 connecting the center points C1 and C2 to each other is extracted.

By detecting the rotation degrees of the extracted straight lines, the code reading apparatus may accurately read the direction information of the segment.

Moreover, the code reading apparatus recognizes as a cell on the printed matter in which each dot code is printed therein a cell surrounded by a center straight line among straight lines positioned between the extracted straight lines in parallel so as to extract the direction information of the segment constituted by the dot codes in each cell.

FIGS. 7 to 11 are diagrams illustrating a method for reading a code in a cell constituted by a plurality of cells each in which dot codes are displayed. In executing the present invention, it is possible to increase the type and size of the data read by the code reading apparatus by using a cell set constituted by a plurality of cells.

Figure 7:
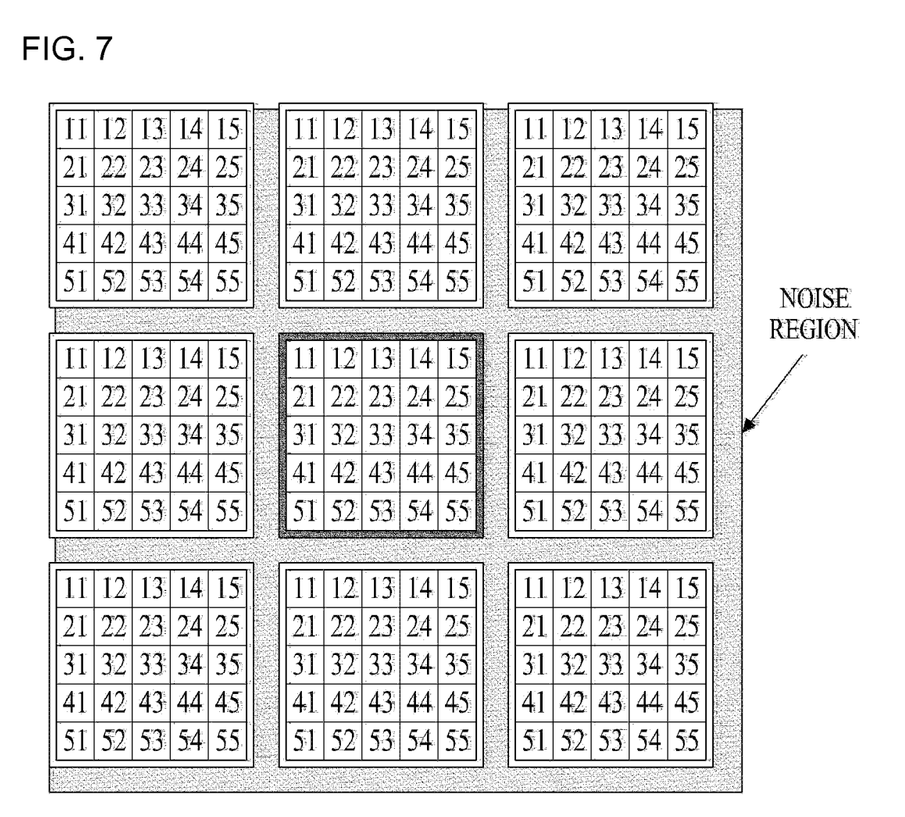
FIGS. 7 to 11 are diagrams illustrating a method for reading a code in a cell set constituted by a plurality of cells each in which dot codes are displayed.

However, as shown in FIG. 7, the code reading apparatus should be able to discriminate a predetermined cell set from adjacent other sets at the time of reading the predetermined cell set in order to interpret data which a predetermined cell set refers to without an error.

Therefore, as shown in FIG. 7, the printed matter is fabricated to surround all cell sets by a noise region where no data is read.

That is, the code reading apparatus detects the noise region where no data is read, recognizes a plurality of cells surrounded by the detected noise region, and reads the corresponding cell set. Thereafter, the code reading apparatus reads the data which the cell set refers to on the basis of the direction information of the segment constituted by the dot codes displayed in the cells constituting the corresponding cell set.

Figure 8:
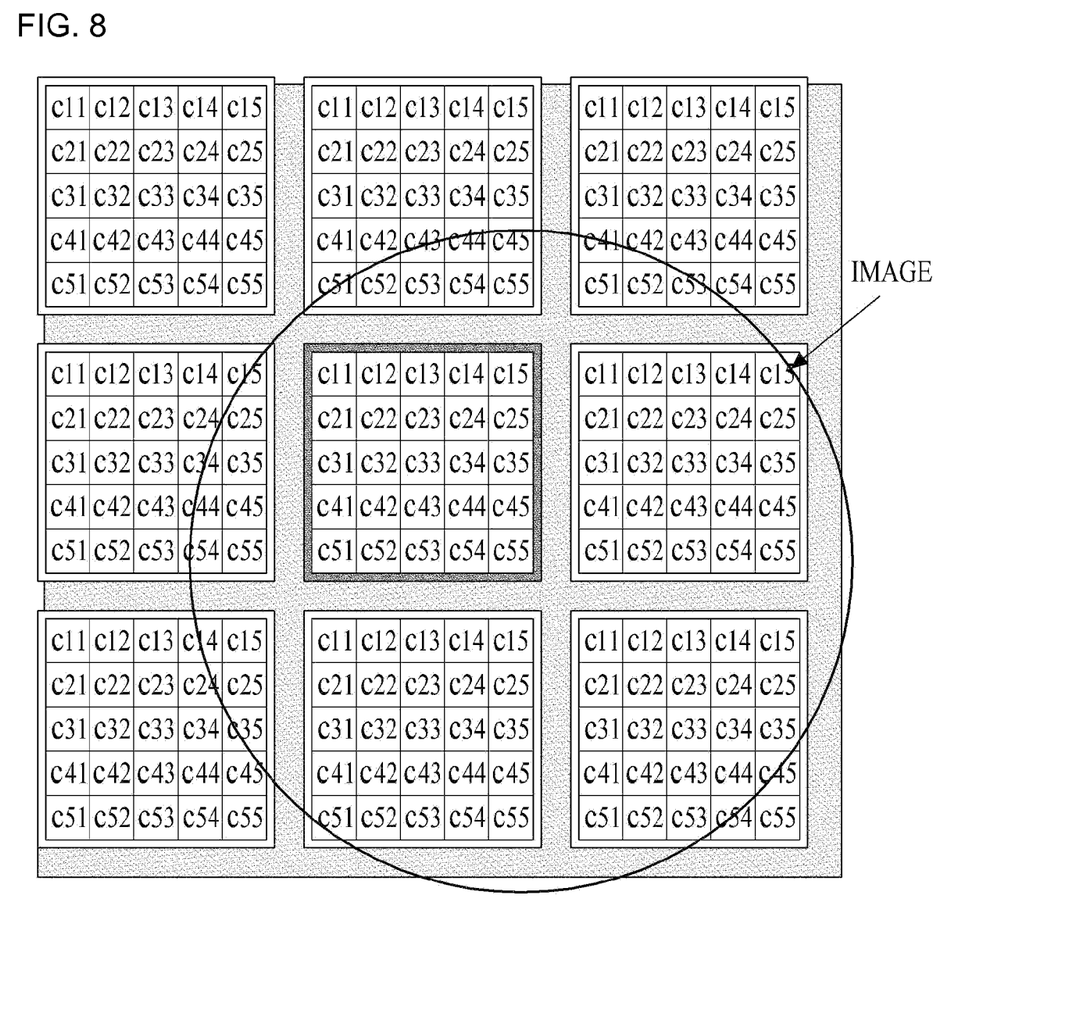

Moreover, in executing the present invention, in the case where the code reading apparatus reads the cell set on the printed matter on which the plurality of cell sets are printed, it is preferable to adjust the sizes of a reading region and the cell set in the code reading apparatus as shown in FIG. 8 in order to detect only one cell set fully surrounded by the noise region.

Figure 9:
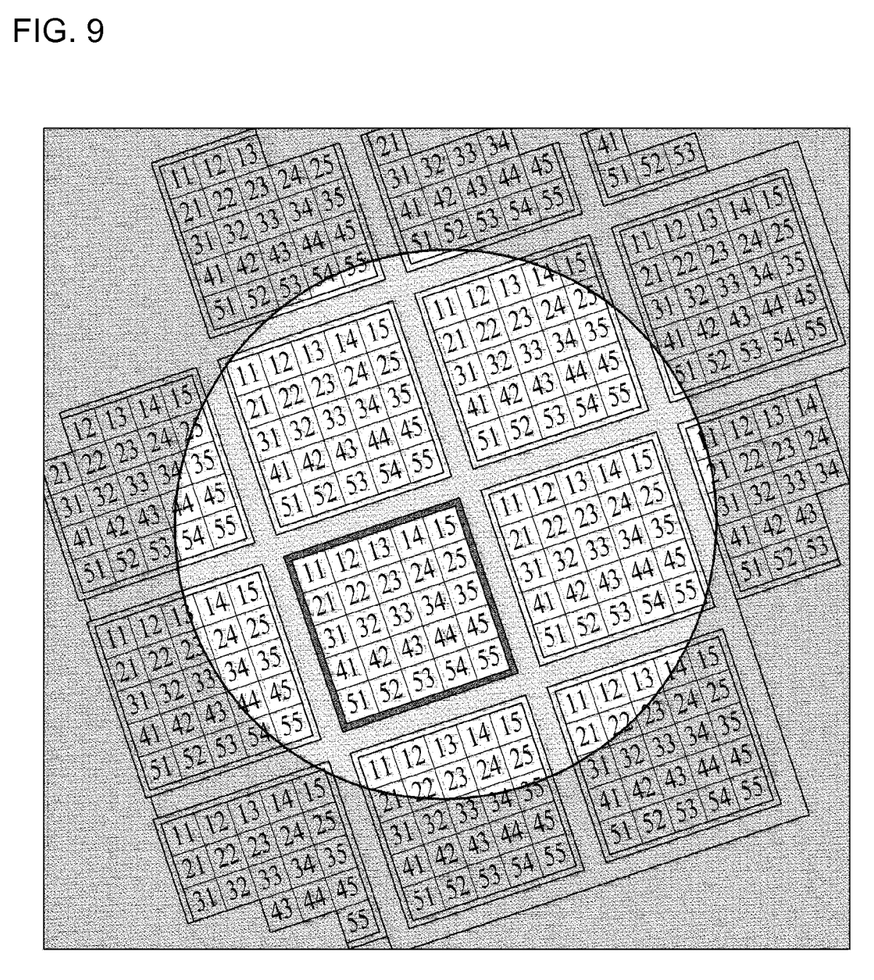

Meanwhile, in executing the present invention, as shown in FIG. 9, the printed matter may be irregularly placed. In this case, the code reading apparatus reads the cell set while a predetermined cell set rotates at predetermined angle.

In this case, the reading apparatus cannot accurately interpret the data which the cell set refers to. Therefore, after the code reading apparatus reads the cell set, correcting the inclined angle of the cell set is required.

Figure 10:
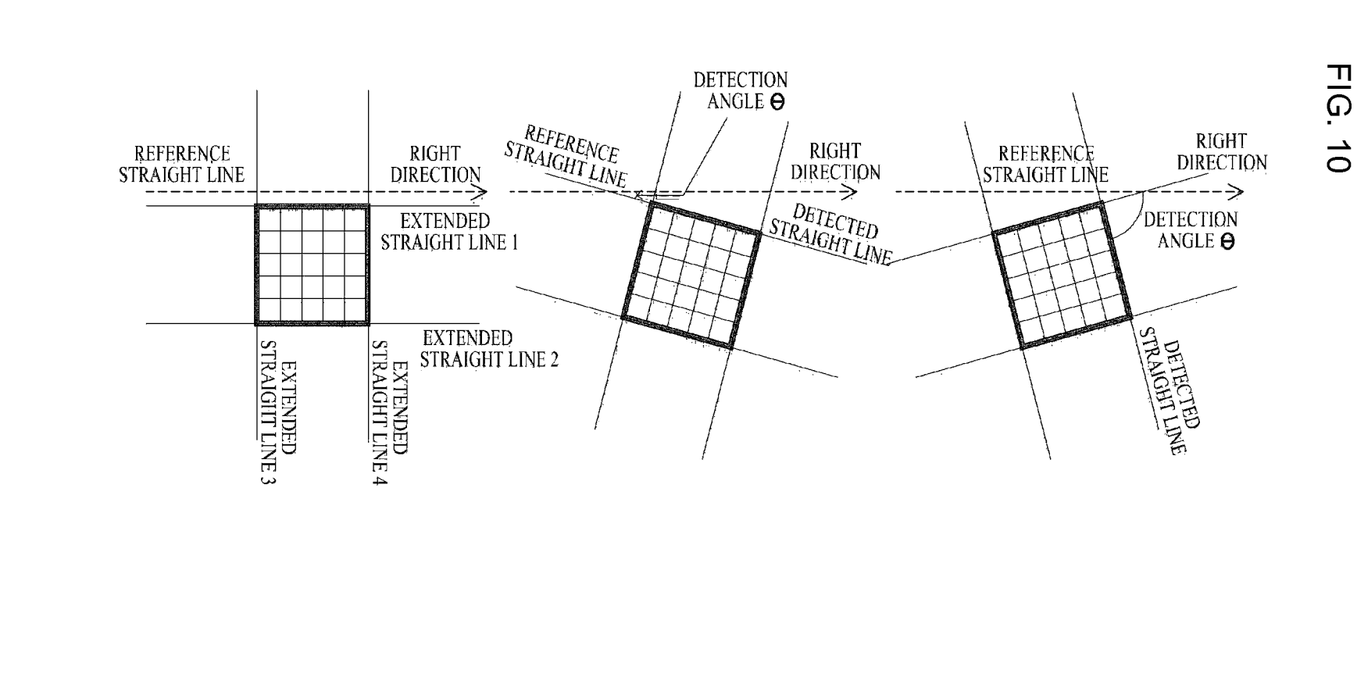

That is, as shown in FIG. 10, in the case where the code reading apparatus sets a reference straight line in itself, the code reading apparatus may calculate an angle between the direction of the noise region which is the direction of an extended straight line extended from each of sides of the noise region having a quadrangle and the reference straight line.

That is, in the case of calculating a detection angle which is the angle between the direction of the noise region and the reference straight line, the code reading apparatus may accurately interpret the data which the corresponding cell set refers to by correcting the read cell set through rotation at the corresponding detection angle.

In executing the present invention, the detection angle is preferably calculated to be an acute angle. However, as shown in FIG. 11, in the case where the printed matter rotates at 90 degrees or more from the reference straight line, when the rotation correction is processed at the detection angle which is the acute angle, the data which the corresponding cell data refers to cannot be accurately read.

Figure 11:
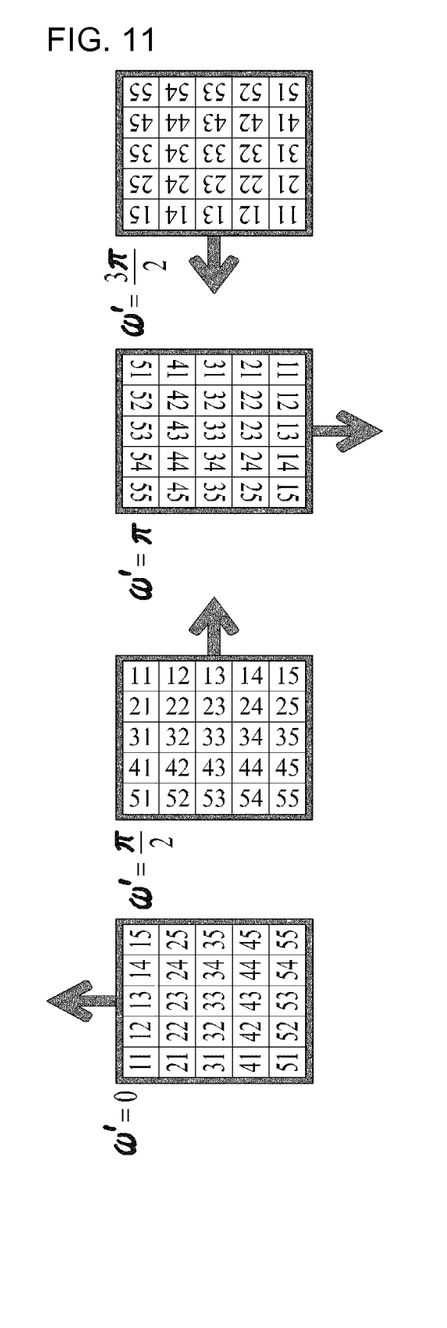

That is, in the case where the printed matter rotates at 90 degrees or more from the reference straight line, when the rotation correction is processed on the basis of the detection angle which is the acute angle, the corresponding cell set is finally recognized as one of four types shown in FIG. 11 depending on the rotation degree of the printed matter.

Accordingly, in executing the present invention, data values are preferably stored in the code reading apparatus so that the code reading apparatus recognizes four types of cell sets in which an angle between a predetermined cell set and the reference straight line is 0 degree, 90, degrees, 180 degrees, and 270 degrees as the same data.

Moreover, in executing the present invention, the segment code or dot code according to the present invention is printed on the surfaces of diversified products and the corresponding code is read on the surface of the product by using the code reading apparatus to provide the name or information of the product to a user.

Meanwhile, the segment code or dot code according to the present invention may be printed as a code that indicates information on a corresponding picture in a picture part for an educational book or as a code that indicates the name or information of a corresponding product at a predetermined portion displayed on the surfaces of diversified pieces of furniture such as a chair, a desk, and the like or diversified products such as an audio device, a TV, and the like.

Industrial Applicability

The present invention may be used as a reader for code recognition.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

The invention claimed is:

1. A method for reading a code displayed on a printed matter, the method comprising:
   reading a segment code which is a segment type code referring to predetermined data, which segment code is displayed on printed matter;
   extracting direction information from the segment code that is displayed on the printed matter and read therefrom; and
   interpreting the predetermined data to which the read segment code refers on the basis of the extracted direction information.

2. The method of claim 1, wherein the segment code is displayed on the printed matter for each cell and the direction information of the segment code includes positional information of the segment code in the cell where the segment code is displayed.

3. A recording medium in which a program for executing each of the steps of claim 1 is recorded.

4. An apparatus for reading a code displayed on a printed matter in which a program for executing each of the steps of claim 1 is installed.

5. A product printed with a code read by a method for reading a code displayed on the printed matter of claim 1.

6. A method for reading a code displayed on a printed matter, the method comprising:
   reading dot codes which are each formed by a pair of points, the dot codes referring to predetermined data, which dot codes are displayed on printed matter;
   extracting direction information from a segment constituted by the dot codes that are displayed on the printed matter and read therefrom; and
   interpreting the predetermined data to which the read dot codes refer on the basis of the extracted direction information.

7. The method of claim 6, wherein the dot codes are displayed on the printed matter for each cell and the direction information of the segment includes positional information of the segment in the cell where the dot codes are displayed.

8. The method of claim 6, wherein the extracting of the direction information includes extracting center points on the segment constituted by the dot codes.

9. The method of claim 8, wherein the extracting of the direction information further comprises extracting a straight line connecting the extracted center points with each other.

10. The method of claim 9, wherein the extracting of the direction information further comprises recognizing a cell defined based on the extracted straight line as a cell on the printed matter.

11. The method of claim 6, wherein the extracting of the direction information further comprises extracting direction information of a dot code which is most distant from a dot code which is most adjacent to the center point of the cell on the printed matter where the dot code is displayed.

12. The method of claim 6, wherein the extracting of the direction information further comprises extracting a straight line connecting the center points of the cells on the printed matter and detecting a rotation degree of the extracted straight line.

13. The method of claim 6, wherein the reading of the dot codes includes recognizing a predetermined point, and a point which is most adjacent to the predetermined point as the dot codes.

14. A method for reading a code displayed on a printed matter, the method comprising:
   reading a cell set constituted by a plurality of cells where each dot is displayed on printed matter, which printed matter-displayed dot codes are each formed by a pair of points referring to predetermined data; and
   interpreting the predetermined data to which the read cell set refers on the basis of a direction information of a segment constituted by the dot codes which are formed by the pair of points, both of which dot codes are displayed on the printed matter in each of the plurality of cells constituting the cell set.

15. The method of claim 14, wherein the reading of the cell set includes:
   detecting a noise region where no data is read; and
   recognizing a plurality of cells surrounded by the detected noise region as the cell set.

16. The method of claim 15, further comprising correcting the read cell set through rotation at an angle between the direction of the noise region which is the direction of an extended straight line extended from each of quadrangular sides of the noise region constituted by the quadrangular sides surrounding the cell set and a predetermined reference line after reading the cell set.

* * * * *